April 19, 1932. F. X. CAMPBELL 1,855,095
MIRROR
Filed April 25, 1930
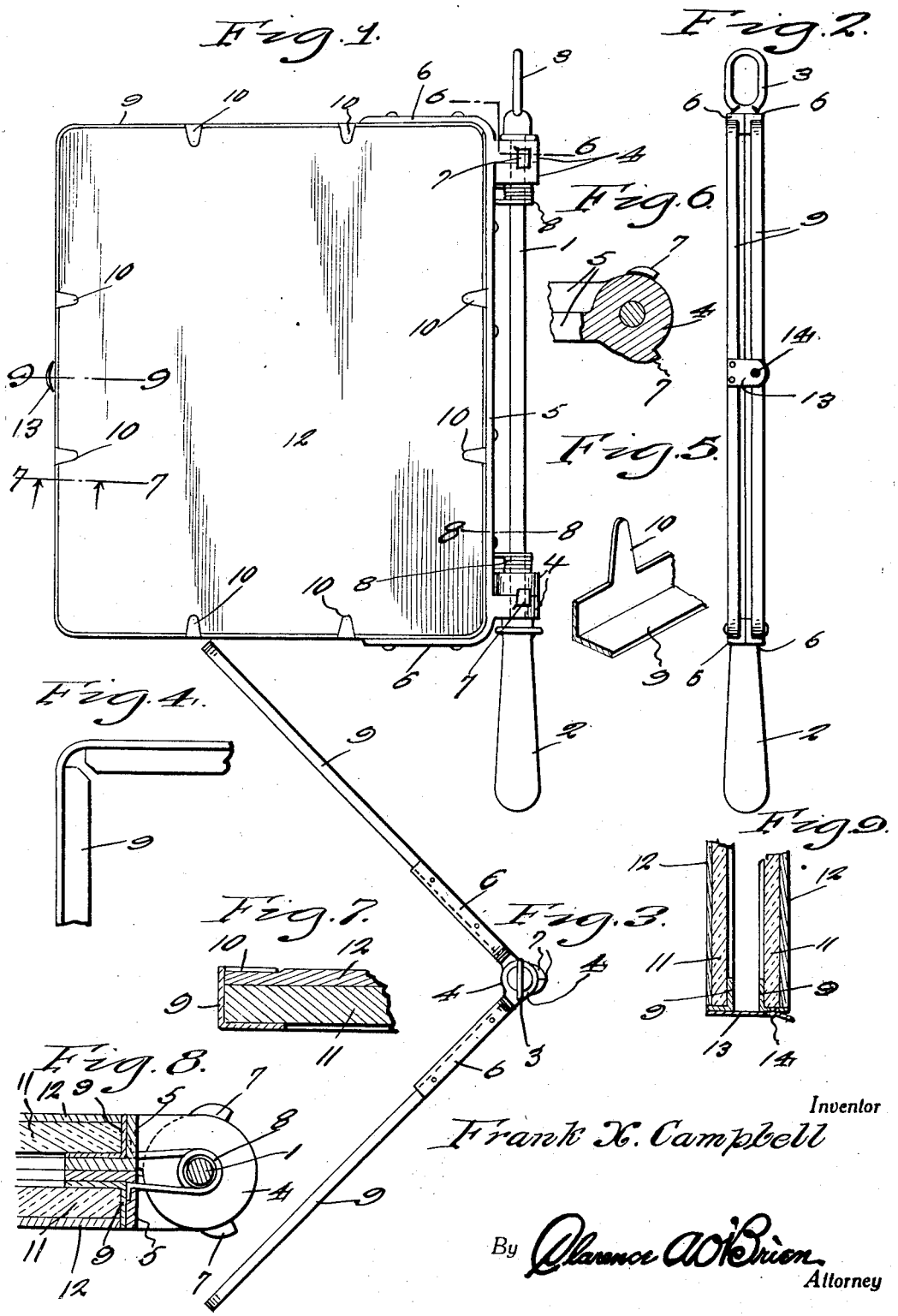
Inventor
Frank X. Campbell
By Clarence A. O'Brien
Attorney Patented Apr. 19, 1932

1,855,095

UNITED STATES PATENT OFFICE

FRANK X. CAMPBELL, OF BRONX, NEW YORK

MIRROR

Application filed April 25, 1930. Serial No. 447,253.

This invention relates to new and useful improvements in mirrors of the general type illustrated and described in my Patent Serial Number 1,815,966, dated July 28, 1931, and upon which this invention constitutes an improvement.

The primary object of the invention is to provide a multiple mirror which is particularly adapted for use in barber shops, beauty parlors, etc. embodying a mirror of hingedly mounted swingable sections of a comparatively simple construction and arrangement having spring controlled means operatively associated therewith for moving the mirrors to open position.

In the drawing which forms a part of this application and in which similar reference characters denote like parts throughout the several views:—

Figure 1 is a view in elevation showing the improved mirror in closed position.

Figure 2 is a view in front elevation showing the device in closed position.

Figure 3 is a top plan view showing the two sections in open position.

Figure 4 is a fragmentary detail view showing a corner portion of one of the rectangular mirror supporting frames.

Figure 5 is a fragmentary detail view in perspective showing one of the retaining tongues formed integrally on the frame for securing the mirror therein.

Figure 6 is a fragmentary detail view in horizontal cross section taken substantially on the line 6—6 of Figure 1.

Figure 7 is a fragmentary detail view in horizontal cross section taken substantially on the line 7—7 of Figure 1 looking in the direction indicated by the arrows.

Figure 8 is a sectional view taken substantially on the line 8—8 of Figure 1.

Figure 9 is a fragmentary horizontal sectional view taken substantially on the line 9—9 of Figure 1.

Referring to the drawing in detail, it will be seen that the reference numeral 1 designates an elongated metallic rod of circular cross section having fixed on its lower end a handle 2 and being provided with a suspension eye 3 on its upper end. A pair of substantially U-shaped brackets are mounted for swinging movement on the rod 1 through the medium of the hinge eyes 4 formed integrally on said brackets adjacent the opposite ends thereof. Said brackets being formed of angle iron and being designated by the reference numeral 5. The reference numeral 6 designates the right angularly disposed arm portion of the brackets 5. The adjacent hinge eyes 4 each have formed integrally thereon a stop lug 7 which projects over the other hinge eye of each pair and said lugs are adapted for abutting engagement with each other in a manner to limit the swinging movement of the brackets on the rod 1 as clearly illustrated in Figure 3 of the drawing. Coil springs 8 encircle the rod 1 adjacent each pair of the hinge eyes and, as illustrated to advantage in Figure 8 of the drawing, the opposite end of each coil spring is operatively connected with one of the brackets 5 in a manner to yieldingly urge the same to open position.

Rigidly mounted in each of the brackets 5 is a substantially rectangular, metallic skeleton frame 9 which is formed of angle iron adapted to seat in the bracket 5. Formed integrally on the rear side of each of the frames 9 are the bendable tongues 10. Mirrors 11 are mounted in each of the frames 9 and a backing plate 12 of any suitable material is also mounted in each of the frames and disposed against the rear side of the mirrors 11.

The tongues 10 are then bent inwardly in the manner clearly illustrated in Figure 1 of the drawing for securing the mirrors and the backing plate in place in their respective frame. A spring latch 13 is mounted on the free end of one of the frames and engageable with a lug 14 on the other frame for securing the mirrors in folded or closed position as best illustrated in Figures 2 and 9 of the drawing.

In use, when the latch 13 is released, the spring 8 swings the mirrors to the position seen in Figure 3 of the drawing when the lugs 7 will engage with each other and arrest the swinging movement of said mirrors.

The foregoing description and the accompanying drawing describe and illustrate a preferred embodiment of the invention but it is, of course, understood that various structural changes may be resorted to without departing from the spirit of the invention or the scope of the appended claims.

What is claimed is:—

1. A mirror of the character described comprising an elongated rod, a handle on one end of the rod, a suspension eye on the opposite end of the rod, a pair of substantially U-shaped brackets, integral hinge eyes on the opposite ends of each of the brackets rotatably encircling the rod in a manner to support the brackets thereon for swinging movement toward and from each other, a coil spring encircling the rod and having its opposite ends operatively engaged with the brackets in a manner to yieldingly swing said brackets apart, co-acting lugs formed integrally on the hinge eyes of the brackets for abutting engagement with each other in a manner to arrest the swinging movement of said brackets under the impulse of the coil spring at a predetermined point, and a mirror rigidly mounted in each bracket for swinging movement therewith.

2. A mirror of the character described comprising an elongated rod of circular cross section, a handle rigidly mounted on one end of the rod, a suspension eye rigidly mounted on the opposite end of the rod, a pair of substantially U-shaped brackets of angular cross section, pairs of integral hinge eyes on the opposite end portions of each bracket rotatably encircling the rod in a manner to mount the brackets for swinging movement thereon toward and from each other, coil springs encircling the rod and having their opposite ends operatively connected to the brackets in a manner to yieldingly urge said brackets in opposite directions, co-acting integral lugs formed on the hinge eyes of each bracket for abutting engagement with each other in a manner to arrest the swinging movement of the brackets under the impulse of the coil spring at a predetermined point, a substantially rectangular, metallic skeleton frame of angular cross section rigidly mounted in each of the brackets for swinging movement therewith, a mirror mounted in each of the frames, a backing plate disposed in each of the frames in abutting engagement with the rear side of each mirror and bendable retaining tongues formed integrally on each frame for engagement over the backing plate in a manner to secure said backing plate and the mirrors in position in their respective frames.

In testimony whereof I affix my signature.

FRANK X. CAMPBELL.